US006357724B1

(12) United States Patent
Hung

(10) Patent No.: US 6,357,724 B1
(45) Date of Patent: Mar. 19, 2002

(54) AUTOMATIC LIFTING DEVICE WITH ILLUMINATION ABILITY

(75) Inventor: Michael Hung, Lu Chu Hsiang (TW)

(73) Assignee: Shinn Fu Corporation, Tao Yuan County (TW)

( * ) Notice: Subject to any disclaimer, the term of this patent is extended or adjusted under 35 U.S.C. 154(b) by 0 days.

(21) Appl. No.: 09/795,399

(22) Filed: Mar. 1, 2001

(51) Int. Cl.[7] .................................................. B60P 1/48

(52) U.S. Cl. .................. 254/8 B; 254/89 H; 254/93 H; 254/DIG. 1

(58) Field of Search ................................ 254/8 B, 126, 254/2 B, 89 H, 93 H, 120, DIG. 1

(56) References Cited

U.S. PATENT DOCUMENTS

| | | | | |
|---|---|---|---|---|
| 4,872,230 A | * 10/1989 | Levine | ....................... | 254/126 |
| 4,977,400 A | * 12/1990 | Jeffries | ........................ | 254/88 |
| 5,262,706 A | * 11/1993 | Hollingsworth | ............. | 254/8 B |
| 5,647,577 A | * 7/1997 | Feldman et al. | ............ | 254/378 |
| 5,901,651 A | * 5/1999 | Boyd | ...................... | 254/134.5 |
| 5,992,826 A | * 11/1999 | Simmonds | .................. | 254/103 |

* cited by examiner

*Primary Examiner*—Joseph J. Hail, III
*Assistant Examiner*—Lee Wilson
(74) *Attorney, Agent, or Firm*—Varndell & Varndell, PLLC

(57) ABSTRACT

An automatic lifting device with a light module is disclosed. The front end of the automatic lifting device has a lateral side plate at each side, a front shaft, a top plate (saddle), a lifting arm and a carry handle. A selected component of the automatic lifting device is attached with a light module providing light at the front lifting end of the device. The light module is attached to the automatic lifting device by one method selected from a group containing magnetic attraction, adhesive, clamping, snapping on, pressing in, locating in, embedding, screwing etc. so that a sufficient illumination is provided at the correct position to the supporting point for an object to be lifted by the automatic lifting device. The light source of the light module is pivotally connected to the body of same light module. Further the light source of the light module is freely adjustable so the orientation of the light source is also adjustable thus providing correct illumination at correct position.

7 Claims, 16 Drawing Sheets

AUTOMATIC LIFTING DEVICE WITH ILLUMINATION ABILITY

FIELD OF THE INVENTION

The present invention relates to an automatic lifting device with illumination ability. Automatic lifting devices, such as floor jacks, garage jacks could benefit from the addition of auxiliary lighting. The applications documented and shown in drawings, all relate to a floor jack for simplicity but should not be narrowly confined to that product alone but rather to the family of products.

BACKGROUND OF THE INVENTION

The variations in design of the conventional Lifting Jacks are only confined to the outlook, the safe specified lifting loads, the specified lifting speeds, or application to a particular vehicle. No jack has been designed from a viewpoint of illumination, i.e. usage in the dark or when the illumination is weak. In operation, the automatic lifting device is placed below a heavy object such as a vehicle for lifting the object. After lifting the object to desired level, supports such as jack stands are used to support the object in a safe manner.

Whether the device is used indoors or outdoors, it is usually placed at a low point on the object which can at times be difficult to be seen for correct and safe application of the lifting device so as to prevent the shifting or damage to the object due to this incorrect positioning of the lifting device. Any portable lighting that is presently available, tends to be clumsy and not too functional, therefore there is a need for functional lighting in a novel design which can attach to or be built into the lifting device and thus be more functional for the user and better than prior art.

SUMMARY OF THE INVENTION

Accordingly, the primary object of the present invention is to provide a lighting module to an automatic lifting device in the correct position so that sufficient light is applied at the correct position of the automatic lifting device to illuminate the object to be lifted, thus the possibility of side movement or damage to the object to be lifted can be avoided.

Another object of the present design is to provide an automatic lifting device with a light module, wherein the light module is installed at a selectable front end of the automatic lifting device, whereas the automatic lifting device has a lateral side plate at each side, a front shaft, a top plate (saddle), a lifting arm and a handle.

A further object of the present invention is to provide an automatic lifting device with a light module, wherein the lighting module is attached to the automatic lifting device by one way selected from a group which includes adhesive, clamping, snapping, embedding, screwing etc. thereby the lighting module is attached to a selected position of the automatic lifting device.

A yet further object of the present invention is to provide an automatic lifting device with a light module wherein the reflecting/directional component of the light module is pivotally connected to the body of the light module. Thus, the reflecting/directional component of the lighting module is independently adjustable so that the orientation or direction of the lighting source is also freely adjustable.

The various objects and advantages of the present invention will be more readily understood from the following detailed description when read in conjunction with the appended drawings.

A BRIEF DESCRIPTION OF THE INVENTION DRAWINGS

Figure 19:
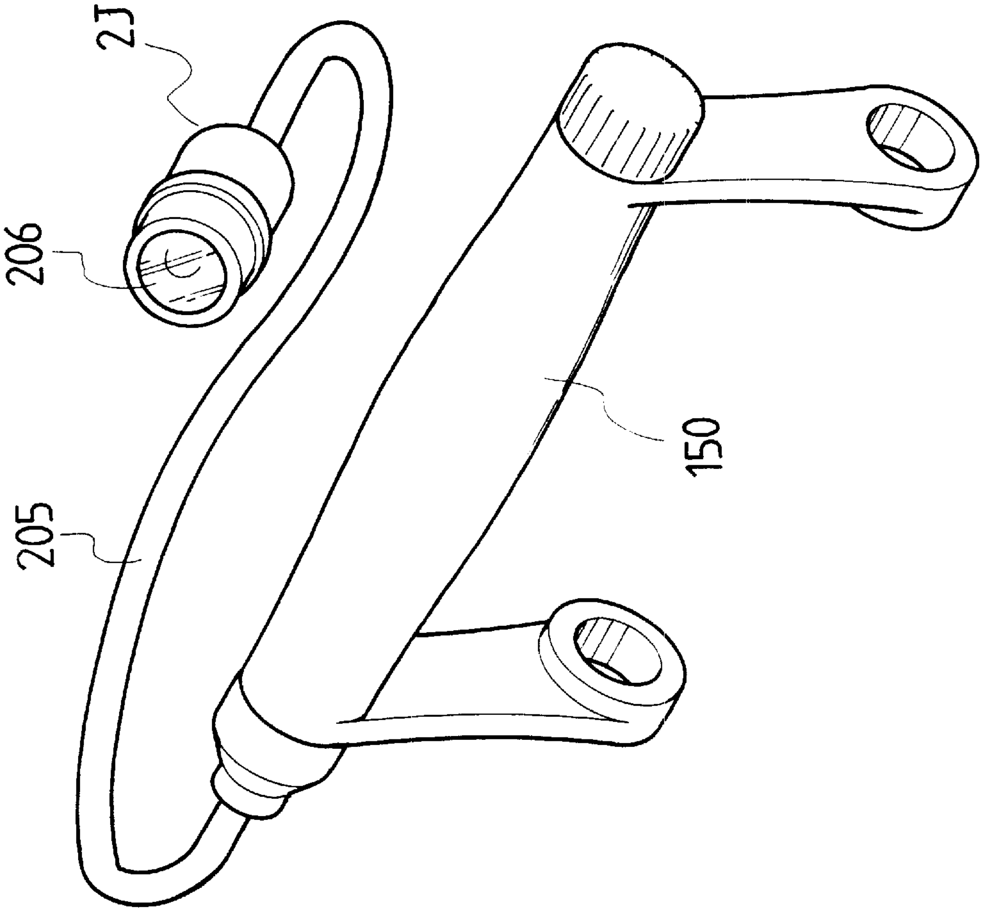
FIG. 19 is a partial schematic view of embodiment the embodiment the embodiment of the light module of the present invention, which is snapped or built into the actual carrying handle of the automatic lifting device, wherein the reflecting/directional component of the light module is pivotally connected to the main body of the Lighting module.
Figure 20:
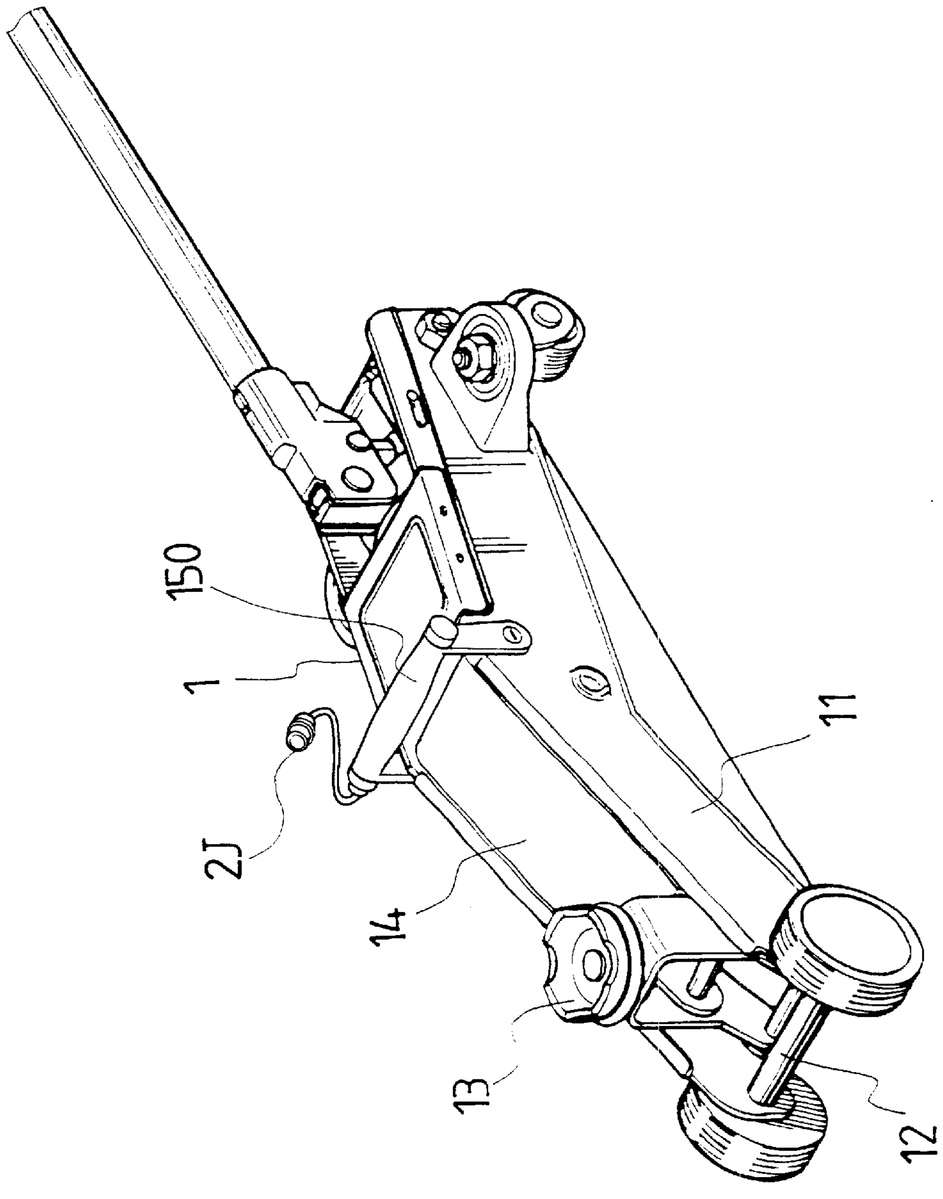

FIG. 20 is a schematic perspective view of embodiment the embodiment (FIG. 19) of the Lighting module of the present invention, which is snapped or built into the actual carrying handle of the automatic lifting device, thus the reflecting/directional component of the Lighting module is independently adjustable so the orientation or direction of the light source of the light module is also freely adjustable.

DETAILED DESCRIPTION OF THE PREFERRED EMBODIMENTS OF THE INVENTION

Referring to FIGS. 1 through 5, the automatic lifting device with various embodiments of the light module of the present invention is illustrated. The present invention includes various embodiments of the light module attached to various parts of the automatic lifting device which include two lateral side plates 11 (FIG. 1), a front shaft 12 (FIG. 2), a top plate (saddle) (FIG. 3), a lifting arm (FIG. 4) and a lifting handle 15 (FIG. 5) and others. The attachment method of the light module of the present invention, to the automatic lifting device includes magnetism, screwing, snapping on, clamping, locating/pressing within, or attaching with adhesive and is done to various components of the automatic lifting device. These light modules, in use, assist in the function of the automatic lifting device i.e. the lifting of heavy objects.

Figure 6:
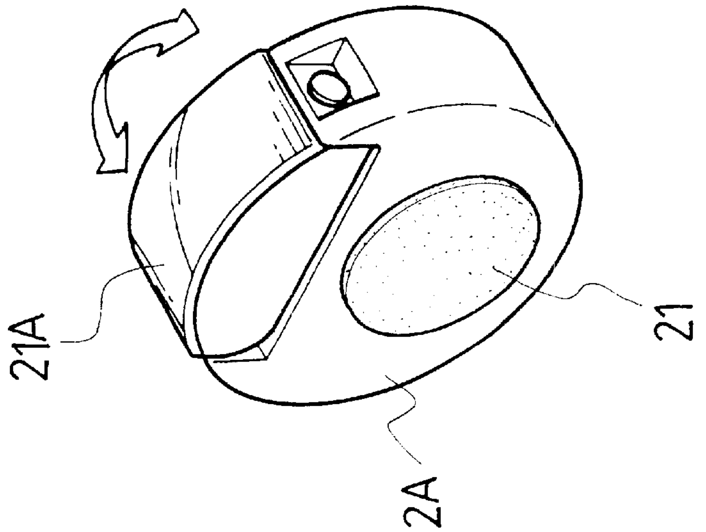
FIG. 6 is a perspective view of embodiment the embodiment the embodiment of the light module of the present invention which has a magnet backing (or adhesive) to self attach to various parts of the automatic lifting device.
Figure 7:
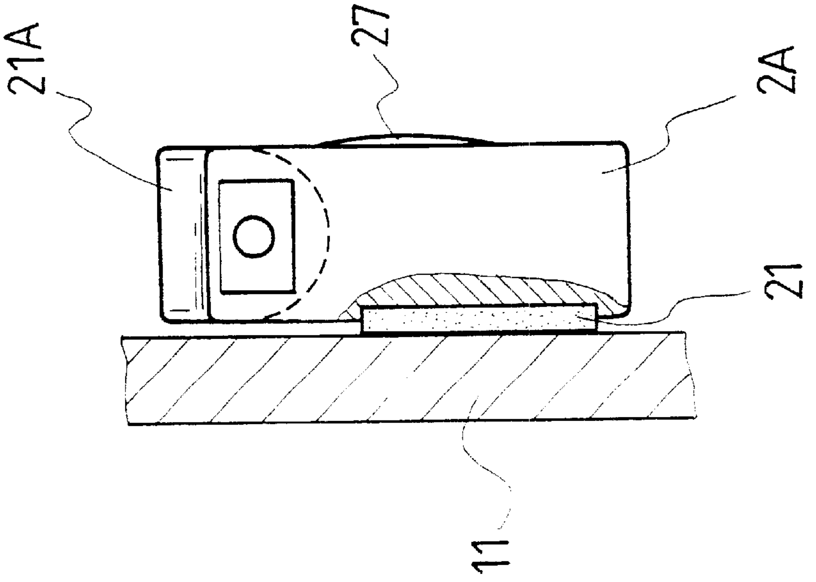
FIG. 7 is a schematic view showing the magnet backed (or adhesive) embodiment (FIG. 6) of the light module of the present invention actually attached to one of the lateral side plates of the automatic lifting device.

In the attachment of the light module of the present invention to the automatic lifting device, the configurations of the same light module, 2A, 2B, 2C, 2D, or 2E are not confined to these embodiments only. For example, one of these light modules 2A, is used as a method of describing the present invention with reference to FIGS. 6 and 7. The main body of the light module 2A is firmly attached with either a magnetic element (or adhesive) 21 at a selected position on one lateral side plate of the automatic lifting device. Thereby, any lateral plate 11 (referring to FIGS. 6 and 7) of the automatic lifting device may be used for this attachment of the Lighting Device.

Figure 8:
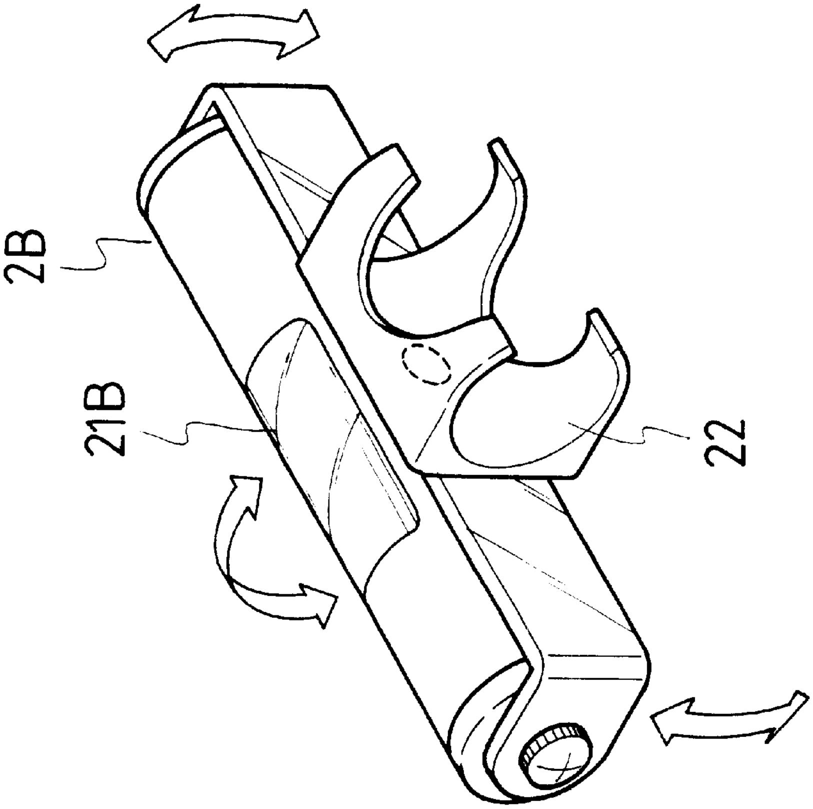
FIG. 8 is a perspective view of embodiment the embodiment the embodiment of the light module of the present invention, which snaps on or clamps to various parts, for example the front shaft, of the automatic lifting device.

In the previous described examples of the attachment of the light module of the present invention, to the automotive Lifting Device, other methods can be accomplished for the attachment. For example in the light module 2B (FIG. 8) to be clamped or snapped to the Automotive lifting device, the light module has a holder 22 at one side or on any selected position of the body so that by using this holder 22, the light module can be clamped or snapped to the front shaft 12 of the automatic lifting device (FIG. 2) so as to provide a function of correct illumination at the correct position.

Figure 9:
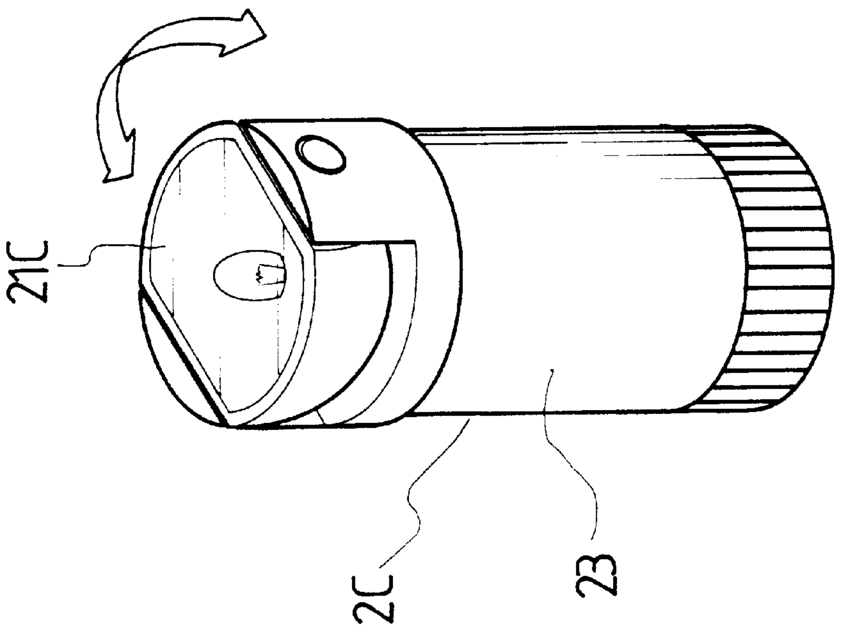
FIG. 9 is a perspective view of embodiment the embodiment the embodiment of the light module of the present invention, which is pressed or located into various parts, for example into the top plate (Saddle) of the automatic lifting device.

In a further example showing the attachment of the light module of the present invention, to the automatic lifting device, the light module 2C as illustrated in FIG. 9 is defined.

Figure 1:
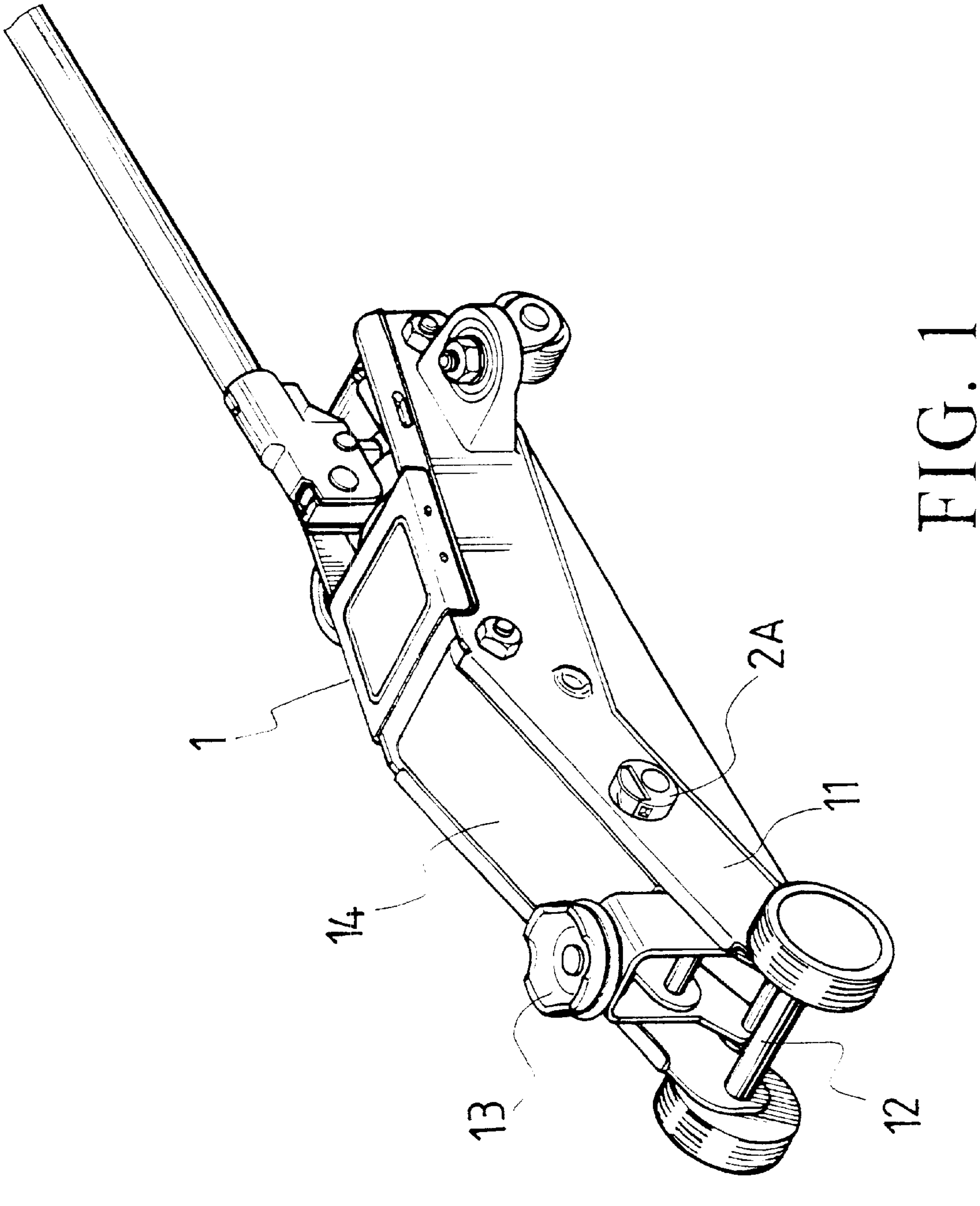
FIG. 1 is an assembled perspective view of a typical automatic lifting device with embodiment the embodiment the embodiment of the light module of the present invention with an installation, by attaching with magnet or adhesive, at a lateral side plate of the automatic lifting device.
Figure 2:
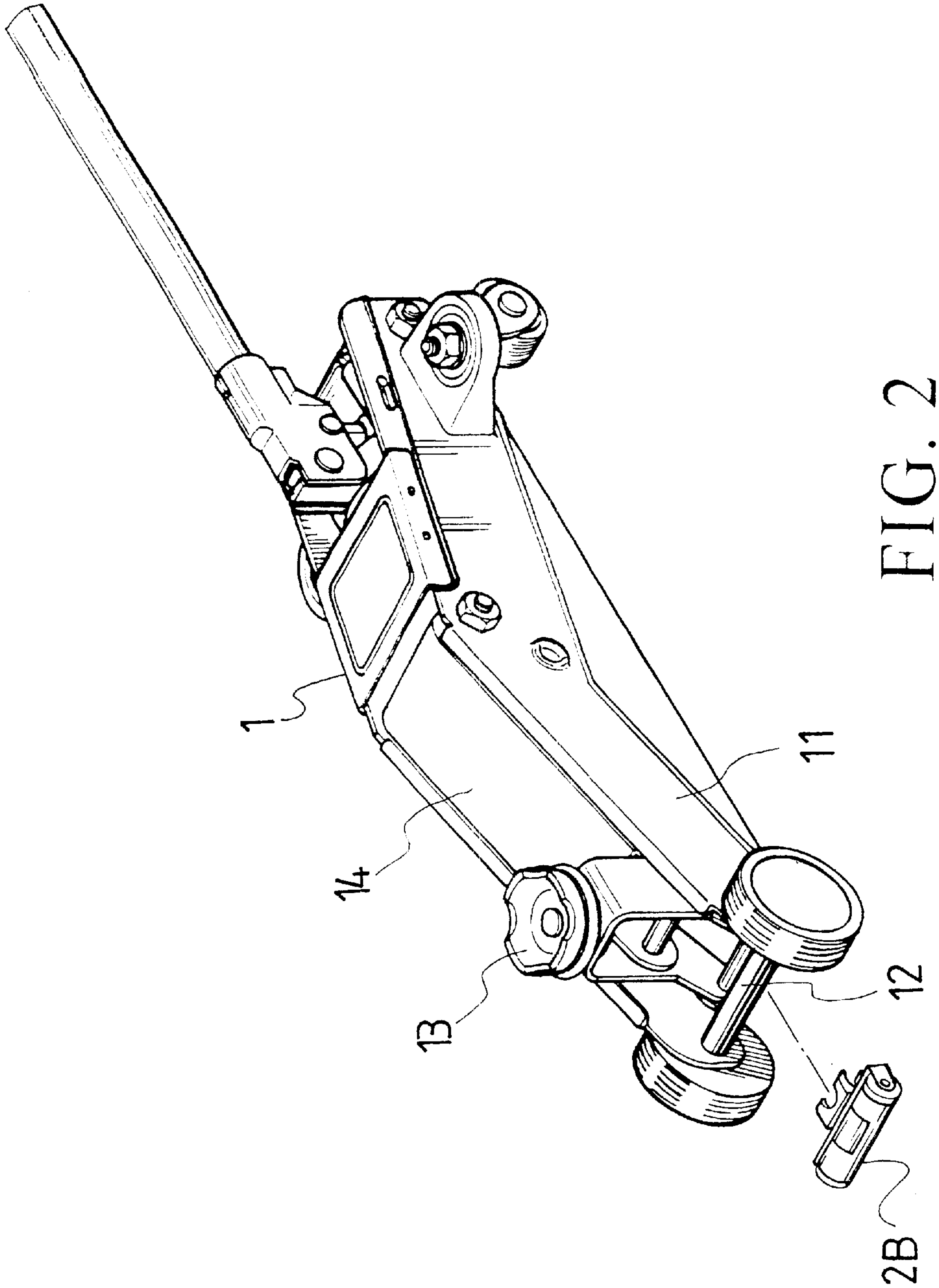
FIG. 2 is an assembled perspective view of a typical automatic lifting device showing embodiment the embodiment the embodiment of the light module of the present invention with an installation by snapping on or clamping to, the front shaft of the automatic lifting device.
Figure 3:
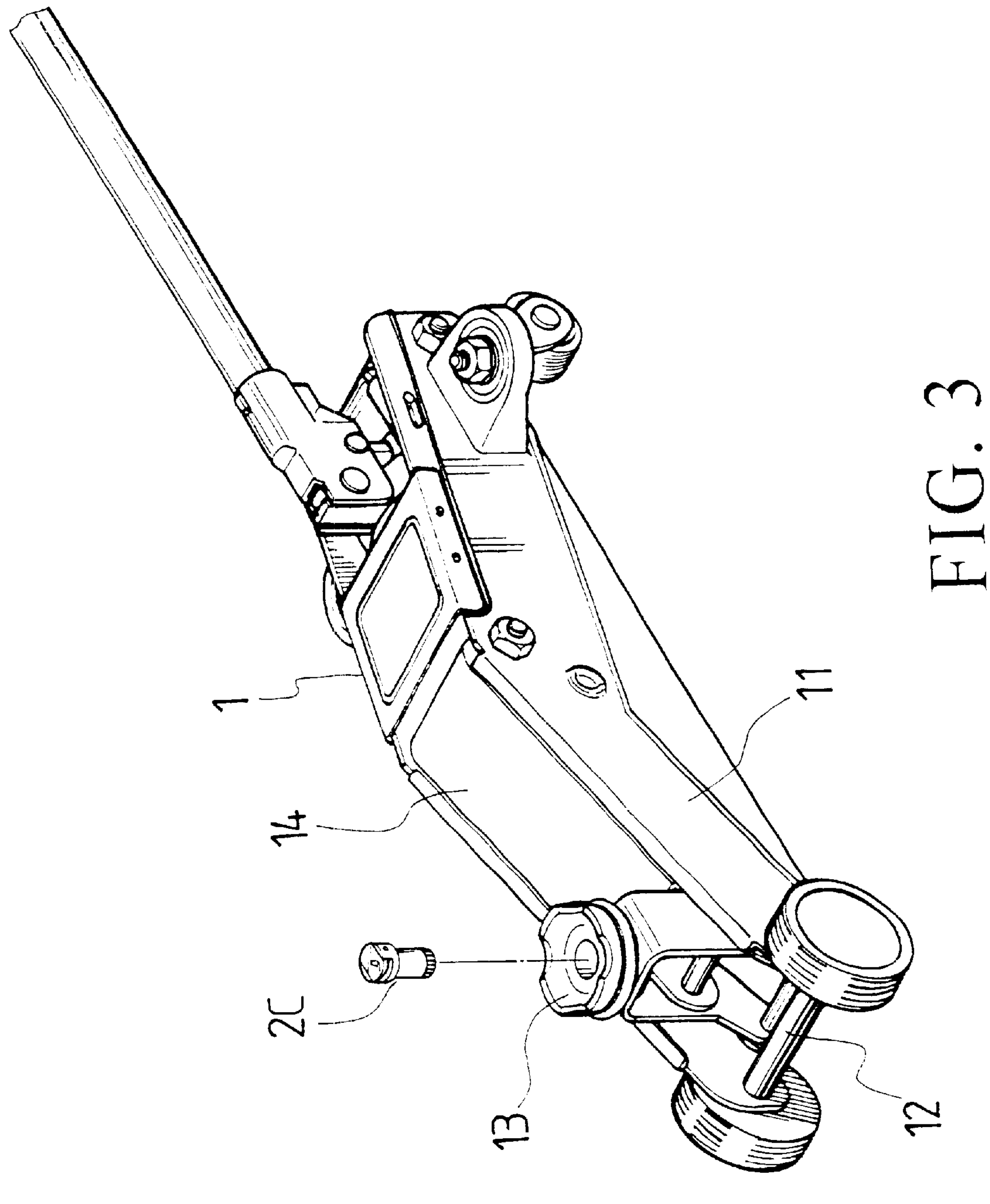
FIG. 3 is an assembled perspective view of a typical automatic lifting device showing embodiment the embodiment the embodiment of the light module of the present invention with an installation, by pressing/locating, into the top plate (saddle) of the automatic lifting device.
Figure 4:
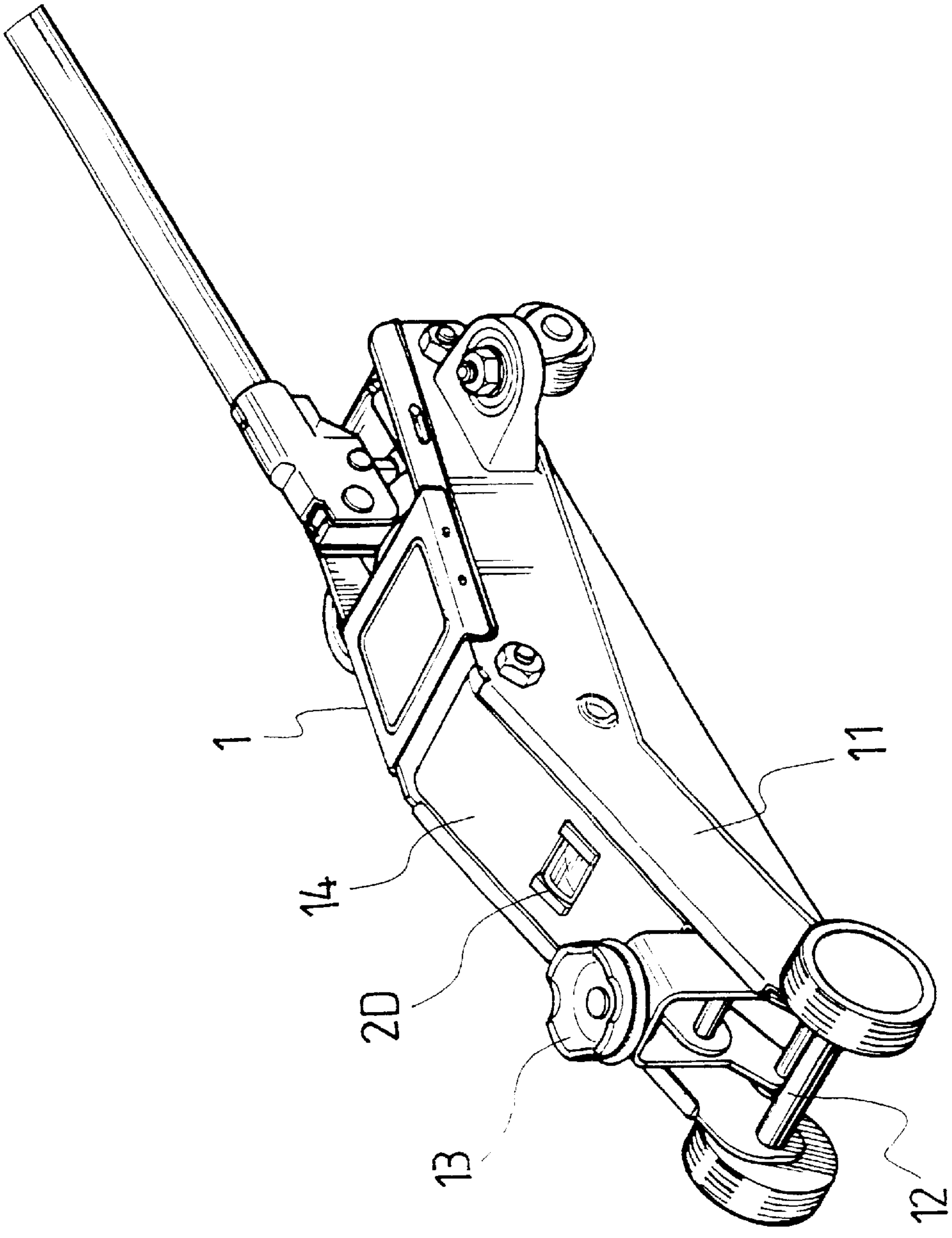
FIG. 4 is an assembled perspective view of a typical automatic lifting device showing embodiment of the light module of the present invention with an installation, by pressing/locating, into the Lifting Arm of the automatic lifting device.
Figure 5:
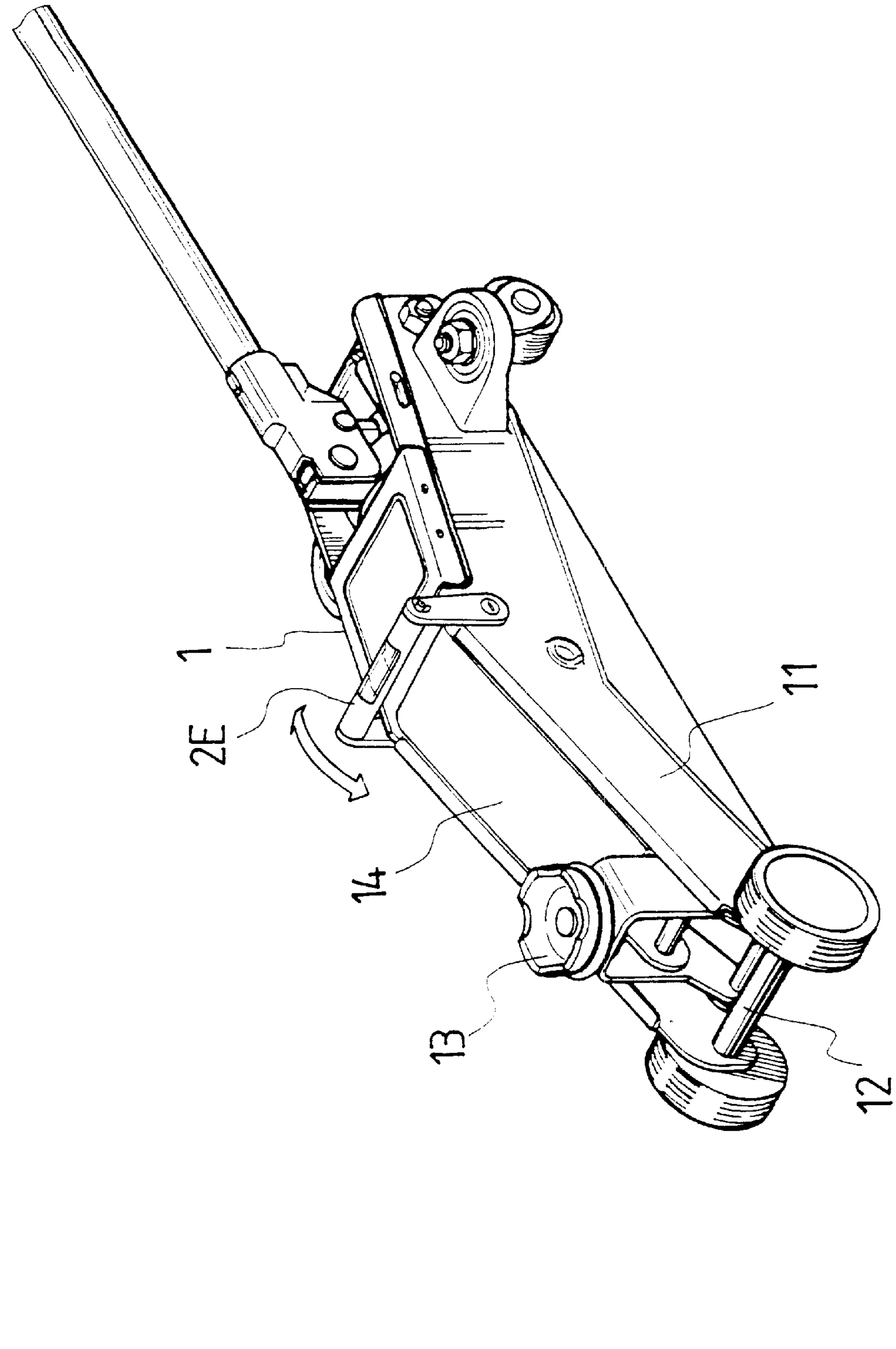
FIG. 5 is an assembled perspective view of a typical automatic lifting device, showing embodiment the embodiment the embodiment of the light module of the present invention with an installation, built within the carry handle of the automatic lifting device.

As having a cylindrical body 23, which is located/pressed into the automatic lifting device, in a provided hole 131, of the top plate (saddle) 13, as illustrated in FIG. 3 of the automatic lifting device, so as to provide another functional method of correct illumination at the correct position.

Figure 10:
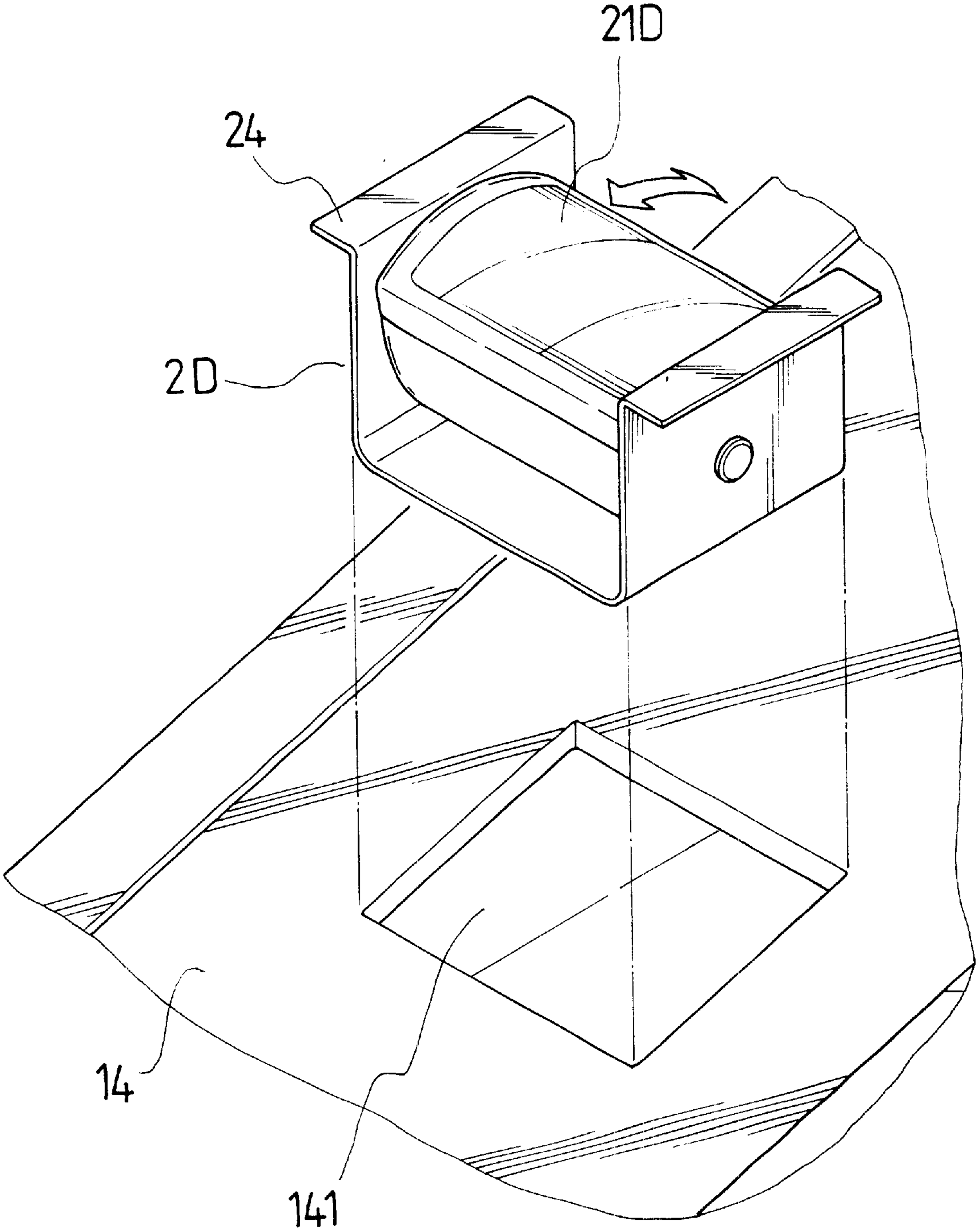
FIG. 10 is a schematic perspective of embodiment the embodiment the embodiment of the light module of the present invention, which is pressed or located into various parts, for example into the top surface of the lifting arm, of the automatic lifting device.
Figure 11:
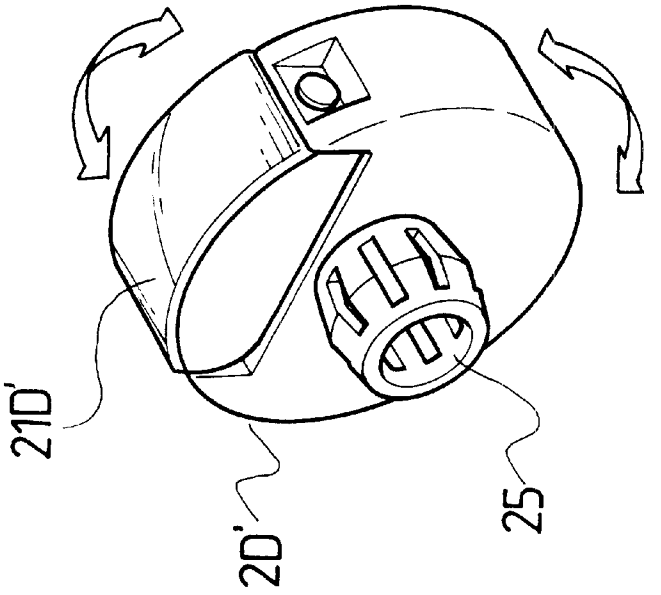
FIG. 11 is a perspective view of embodiment the embodiment the embodiment of the light module of the present invention, with an expanding type insertion sleeve for snapping into various parts of the automatic lifting device.

In a further example showing the attachment of the light module of the present invention, to the automatic lifting device, the light module shown in FIG. 10, is attached in the 'U' shaped support plate 24. Further the Lighting module is located/pressed into the locating hole 141 in the lifting arm 14 (FIG. 4) of the automatic lifting device in conjunction with the 'U' shaped support plate 24, so as to provide another functional method of correct illumination at correct position.

Figure 12:
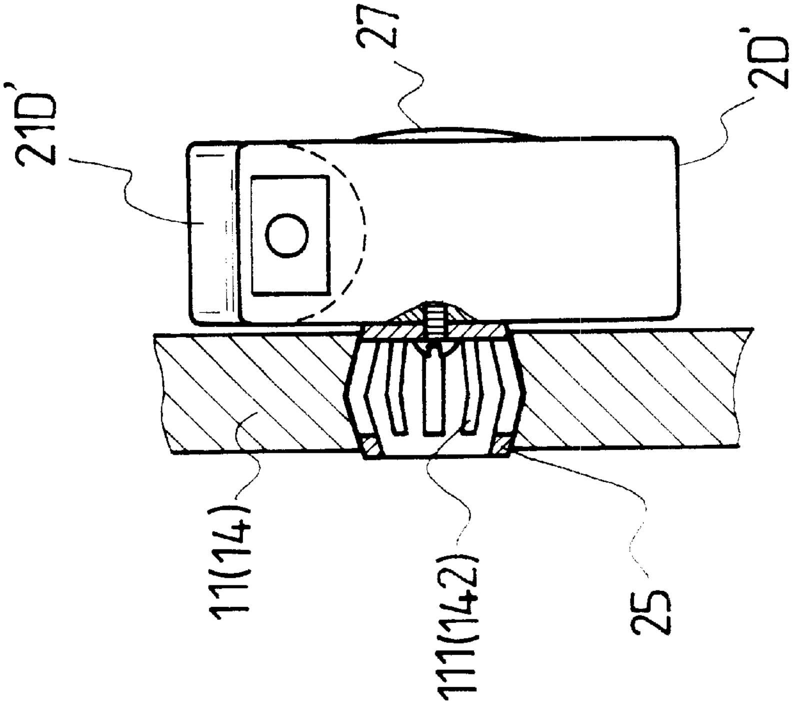
FIG. 12 is a schematic view showing the expandable type insertion sleeve embodiment (FIG. 11) of the light module of the present invention, actually inserted into one of the side lateral plates or the lifting arm of the automatic lifting device.

In a further example showing the attachment of the light module of the present invention to the automatic lifting device, the light module 2D is firmly attached to an expanding type sleeve to one side or a selected position on its body. Then the Lighting Device is snapped into a hole in the lifting arm 14 or another selected hole 111 (142) at any lateral plate 11 (FIG. 12) of the automatic lifting device, so as to provide another functional method of correct illumination at the correct position.

Figure 13:
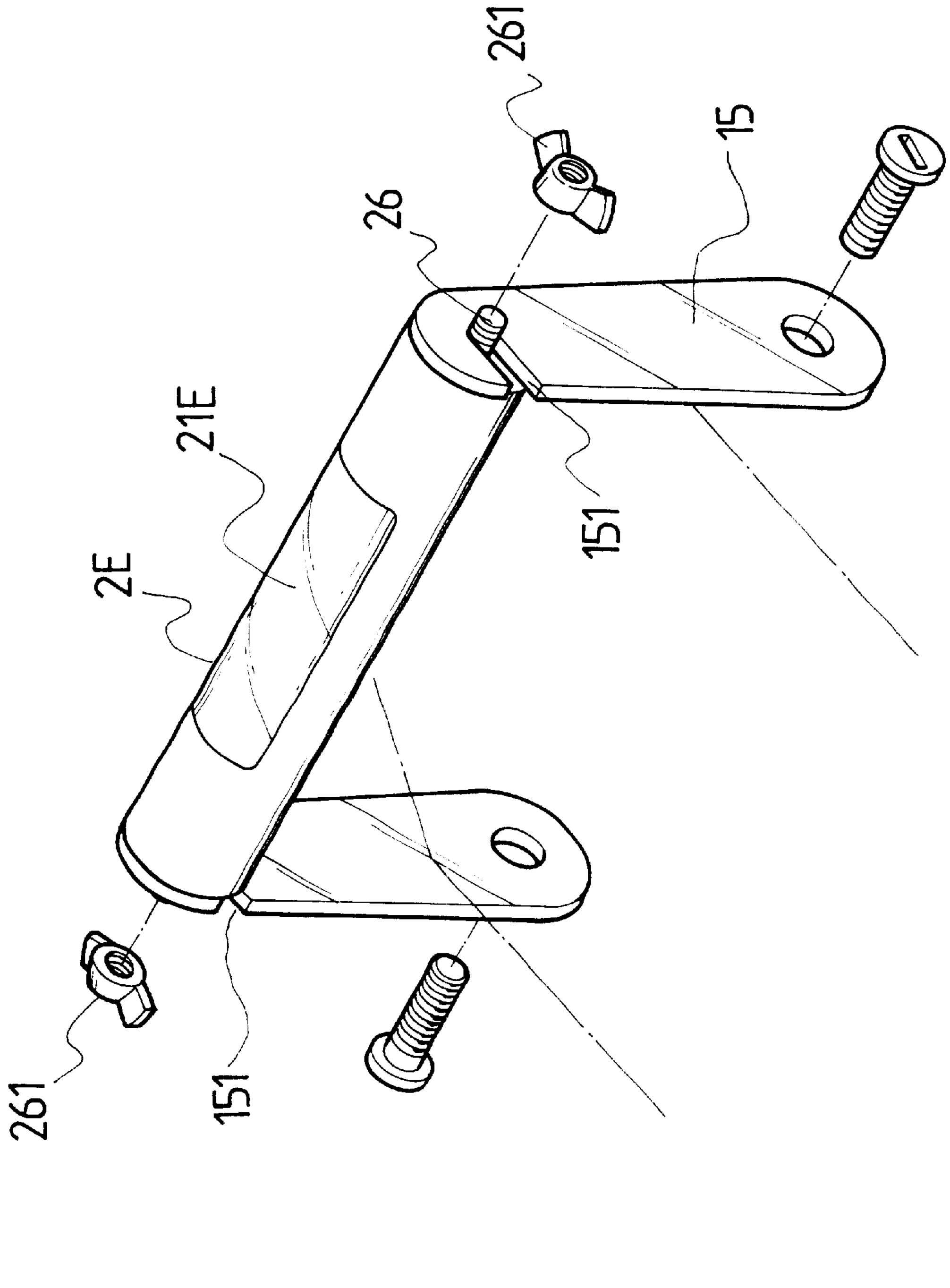
FIG. 13 is a schematic perspective view showing embodiment the embodiment the embodiment of the light module of the present invention, which is snapped or built into the actual carrying handle of the Automotive Lifting device.

A further example showing the attachment of the light module, of the present invention, to the automatic lifting device, the light module 2E is firmly embedded into the carry handle of the automatic lifting device as shown in FIG. 13. One end or both ends of the body of the light module are installed with protruding studs 26, and one or two sides of the handle 15 are formed with open slots or holes 151. The protruding studs of the light module 2E can be engaged with the open slots or holes 151 of the handle 15, then the nuts or butterfly type nuts 261 are used to lock the light module to the two sides of the handle 15, as an integral part of the carry handle attached to the automatic lifting device, so as to provide another functional method of correct illumination at the correct position.

Figure 14:
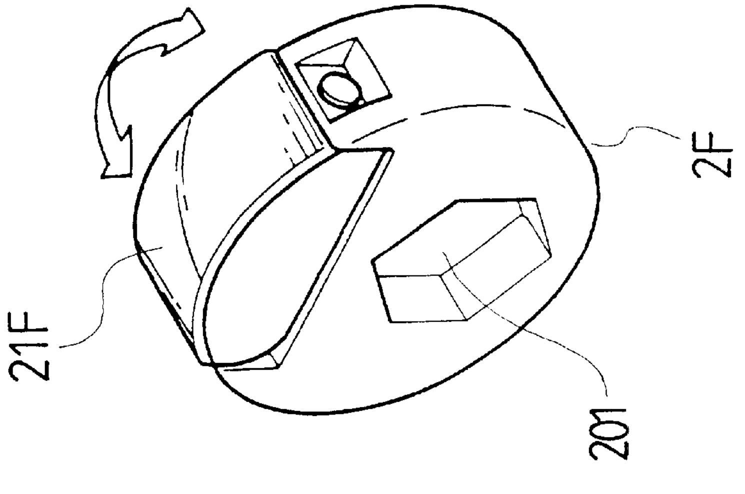
FIG. 14 is a perspective view of embodiment the embodiment the embodiment of the Lighting module of the present invention, with a female indentation for snapping onto a matching male protrusion, on various parts of the automatic lifting device.
Figure 15:
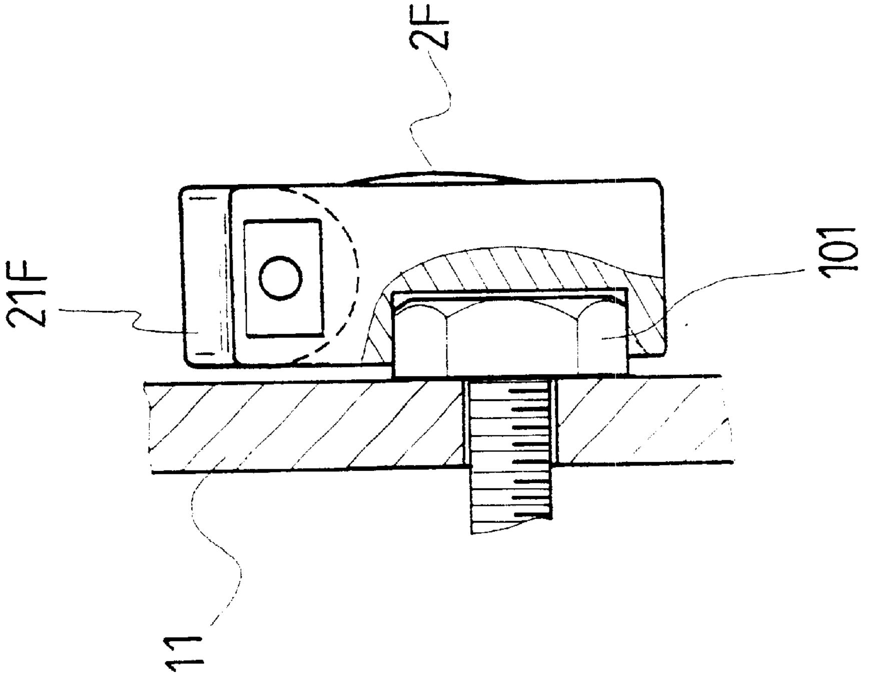
FIG. 15 is a schematic view showing the female indentation embodiment (FIG. 14) of the light module of the present invention, actually snapped onto the matching male protrusion piece which is screwed into one of the side lateral plates of the Automotive lifting device.

Another example showing the attachment of the light module, of the present invention, to the automatic lifting device, is shown in FIGS. 14 and 15 wherein the body of the light module 2F has a female indentation built in, at one side. Thereby the light module 2*f* can be located/pressed onto the protruding form of the stud or nut and further installed on the lateral plate 11 of the automatic lifting device to provide another functional method of correct illumination at the correct position.

Figure 16:
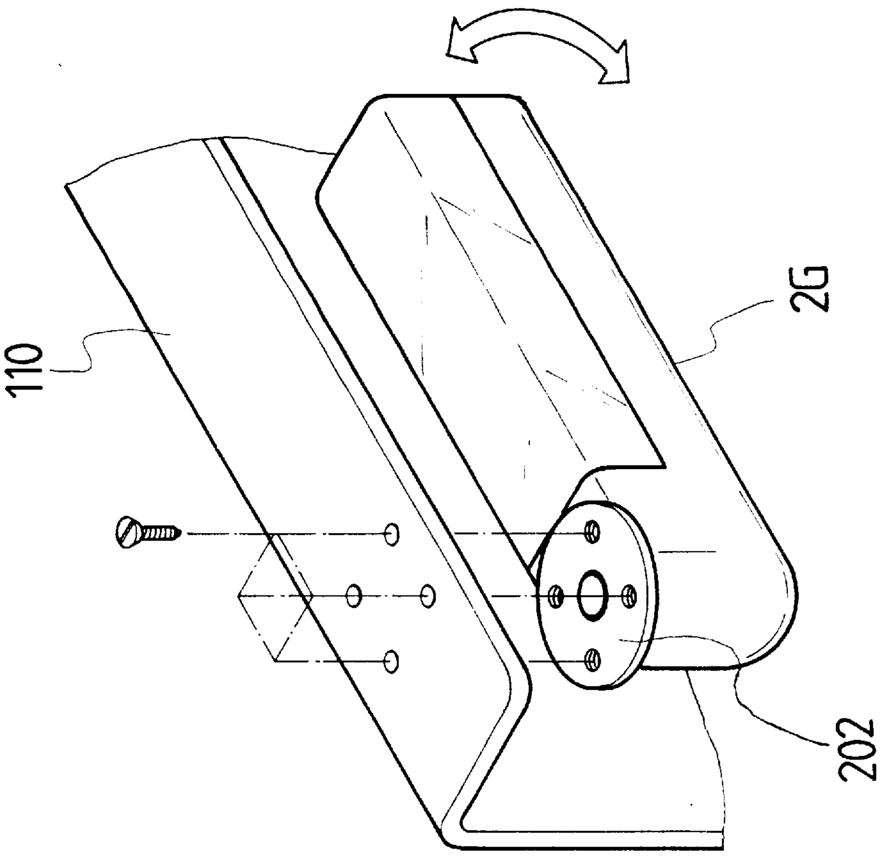
FIG. 16 is a partial schematic view of embodiment the embodiment the embodiment of the light module of the present invention, which swings out in use and is screwed to the flange of one of the side lateral plates of the automatic lifting device.

A still further example showing the attachment of the light module, of the present invention, to the automatic lifting device is shown in FIG. 16 wherein a rotating disc 202 can be installed on a selected position of the body of the light module 2*g* so that the light module 2G can be fastened at any position on the lateral side plate 110 of the automatic lifting device and by further rotation of the same disc 202 a multitude of illuminating positions are available, again providing another functional method of correct illumination at correct position.

Figure 17:
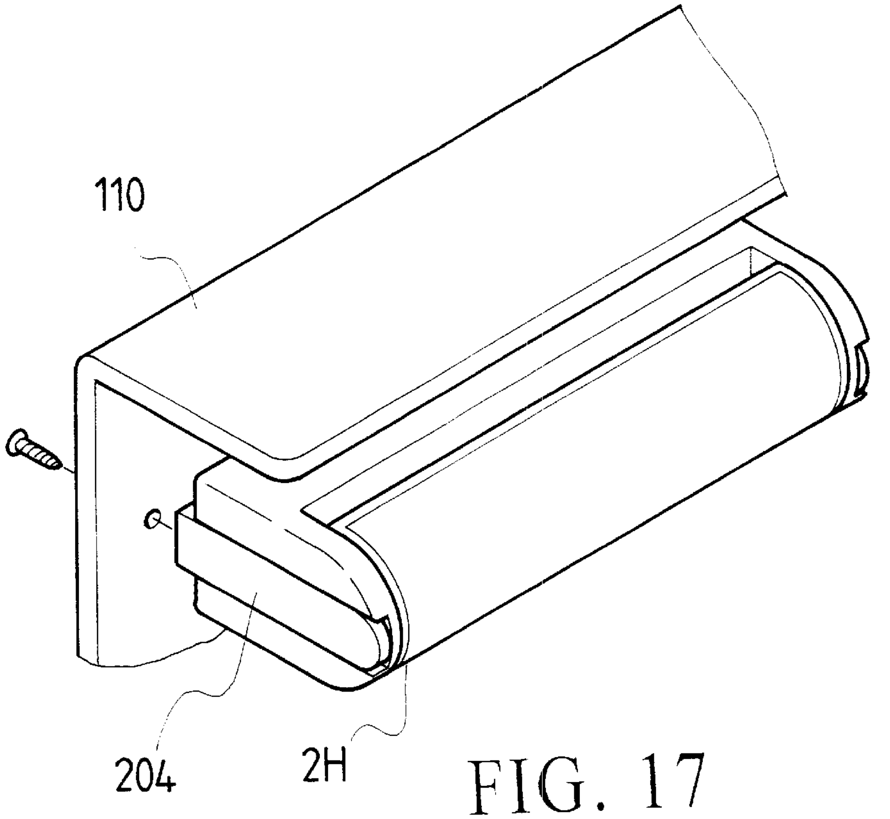
FIG. 17 is a partial schematic view of embodiment the embodiment the embodiment of the light module of the present invention, in its stored position, which is screwed to one of the side lateral plates of the automatic lifting device.
Figure 18:
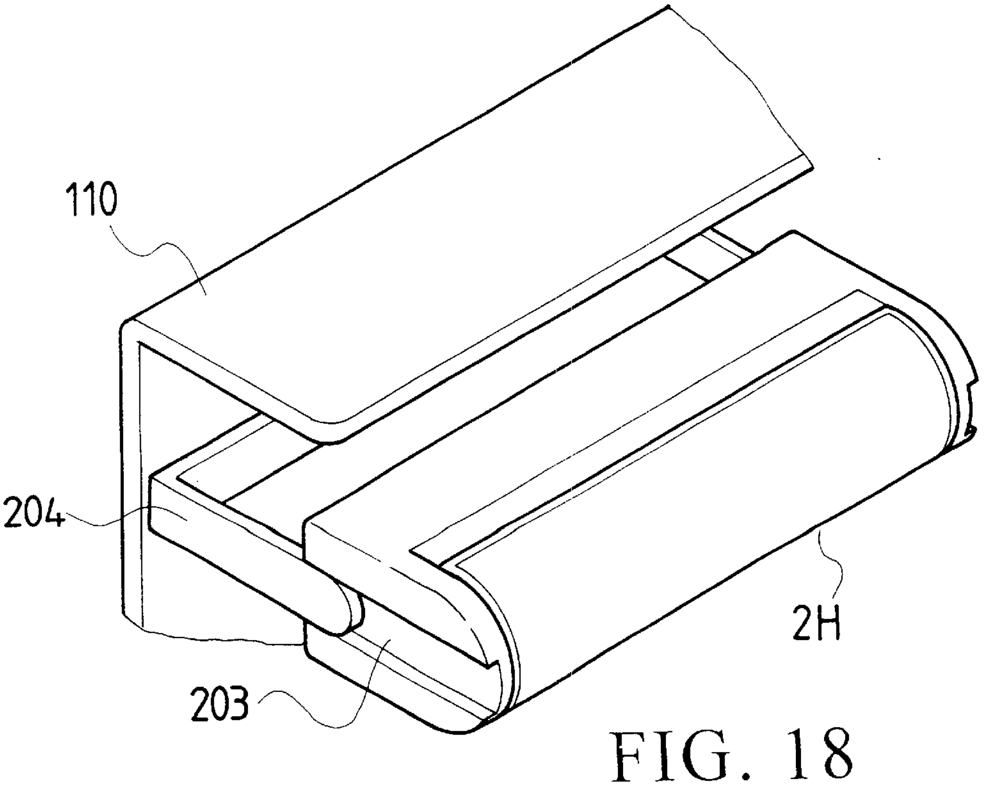
FIG. 18 is a partial schematic view of embodiment the embodiment (FIG. 17) of the Lighting module of the present invention, in its extended or pulled out position on its sliding track for use, on one of the lateral side plates of the automatic lifting device.

Another further example showing the attachment of the light module, of the present invention, to the automatic lifting device is shown in FIGS. 17 and 18 wherein the body of the light module 2H can be attached to a 'U'shaped locator 204, by use of slots 203, with a built in stop. The same 'U' shaped locator 204 is attached to any position of the lateral side plate of the automatic lifting device Module so the match of the slots in the light module to the arms of the 'U' shaped locator allow the light module to be slid out, again providing another functional method of correct illumination at correct position.

Referring to FIGS. 19 and 20, shows another example of the attachment of the light module, of the present invention, to the automatic lifting device wherein the carry handle 150 of the automatic lifting device consists of the light module 2J . The carry handle of the Automotive Lifting device can be used for insertion and storage of the battery(s) to power the light module. One end of the carry handle of the automatic lifting device is attached with a flexible tube 205, which in turn is connected mechanically and electrically with the lamp 206. The carry handle 150 is fastened to the automatic lifting device as shown in FIG. 20 so again providing another functional method of correct illumination at correct position.

In all the aforementioned examples of attachment of a light module, of the present invention, to an automatic lifting device, the light module can be attached by use magnetic attraction, adhesive, clamping, snapping, inserting, pressing in, screwing etc. Furthermore the light source 21A, 21B, 21C, 21D, 21D', 21E or 21F of the light module 2A, 2B, 2C, 2D or 2E can be independently moveable in its connection to the body of the light module, thus the same light source 21A, 21B, 21C, 21D, 21D', 21E or 21F can be freely adjusted again providing another functional method of correct illumination at correct position.

In the aforesaid light modules, of the present invention, the bodies can enclose the batteries. A control on/off or rotating switch can be installed at a selected position on the light module for actuation of the lighting source.

The present inventions are thus described, and it will be obvious that the same inventions may be varied by many methods of design, fastening or function. Such variations are not to be regarded as a departure from the spirit and scope of the present invention, and all such varied methods of arriving at the final functions of the invention as would be obvious to one skilled in the art are intended to be included within the scope of the following claims.

What is claimed is:

1. An automatic lifting device combined with a light module: such that a selected front end of the automotive lifting device is attached with a light module, so that sufficient light is provide at a correct position for an object to be positioned at one top of the automatic lifting device, wherein a front end of the automatic lifting device consists of two lateral side plates, a front shaft, a top plate (saddle), a lifting arm, and a carry handle.

2. An automatic lifting device combined with a light module: such that a selected front end of the automotive lifting device is attached with a light module, so that sufficient light is provide at a correct position for an object to be positioned at one top of the automatic lifting device; wherein the light module is attached to the automatic lifting device by ways selected from a group that includes magnetic attraction, adhesive, clamping, snapping, insertion, pressed in, and use of screws; and the insertion type combination of the automatic lifting device with the lighting module is achieved, by the body of the lighting device being extended with a cylindrical portion, and by this cylindrical portion being inserted or pressed into a hole provided in the top plate (saddle) of the automatic lifting device, thus providing illumination.

3. An automatic lifting device combined with a light module: such that a selected front end of the automotive lifting device is attached with a light module, so that sufficient light is provide at a correct position for an object to be positioned at one top of the automatic lifting device; wherein the light module is attached to the automatic lifting device by ways selected from a group that includes magnetic attraction, adhesive, clamping, snapping, insertion, pressed in, and use of screws; and the insertion type combination of the automatic lifting device with a light module is achieved by the body of the light module being installed in a 'U' shaped support plate which is then inserted into a hole in the lifting arm of the automatic lifting device, thus providing illumination.

4. An automatic lifting device combined with a light module: such that a selected front end of the automotive lifting device is attached with a light module, so that sufficient light is provide at a correct position for an object to be positioned at one top of the automatic lifting device; wherein the light module is attached to the automatic lifting device by ways selected from a group that includes magnetic attraction, adhesive, clamping, snapping, insertion, pressed in, and use of screws; and the combination is achieved by installing a rotating disk at a selected position on the body of the light module, so that the light module is locked at any position of the lateral side plate of the automotive lifting device: further by rotating the rotating disk to a required position, thus providing illumination.

5. An automatic lifting device combined with a light module: such that a selected front end of the automotive lifting device is attached with a light module, so that sufficient light is provide at a correct position for an object to be positioned at one top of the automatic lifting device; wherein the light module is attached to the automatic lifting device by ways selected from a group that includes magnetic attraction, adhesive, clamping, snapping, insertion, pressed in, and use of screws; and the screw on type combination is achieved by the attachment of the "U" shaped locator to be screwed to lateral side plates of the automatic lifting device, and the matching of the slots in the body of the light module to the arms of the same "U" shaped locator thus allowing the light module to slide out to a correct position, thus providing illumination.

6. An automatic lifting device combined with a light module: such that a selected front end of the automotive lifting device is attached with a light module, so that sufficient light is provide at a correct position for an object to be positioned at one top of the automatic lifting device; wherein the light module is attached to the automatic lifting device by ways selected from a group that includes magnetic attraction, adhesive, clamping, snapping, insertion, pressed in, and use of screws; and the carry handle has a flexible tube extending from one end with the light source on the front end of the flexible tube, and the carry handle is attached to the automotive lifting device, thus providing illumination.

7. An automatic lifting device combined with a light module: such that a selected front end of the automotive lifting device is attached with a light module, so that sufficient light is provide at a correct position for an object to be positioned at one top of the automatic lifting device; wherein the light module is attached to the automatic lifting device by ways selected from a group that includes magnetic attraction, adhesive, clamping, snapping, insertion, pressed in, and use of screws; and the light source of the light module is connected by a pivot component to the body of the same light module, and the light source thus is oriented so that an adjustable illumination is provided.

* * * * *